US010250499B2

(12) United States Patent
Stokking et al.

(10) Patent No.: US 10,250,499 B2
(45) Date of Patent: Apr. 2, 2019

(54) MULTICAST TRANSMISSION USING PROGRAMMABLE NETWORK

(71) Applicants: Koninklijke KPN N.V., Rotterdam (NL); Nederlandse Organisatie voor toegepast-natuurwetenschappelijk onderzoek TNO, The Hague (NL)

(72) Inventors: Hans Maarten Stokking, Wateringen (NL); Adrianus Cornelis Gerardus Holtzer, Delft (NL); Mattijs Oskar van Deventer, Leidschendam (NL)

(73) Assignees: Koninklijke KPN N.V., Rotterdam (NL); Nederlandse Organisatie voor toegepast-natuurwetenschappelijk onderzoek TNO, The Hague (NL)

( * ) Notice: Subject to any disclaimer, the term of this patent is extended or adjusted under 35 U.S.C. 154(b) by 33 days.

(21) Appl. No.: 15/245,980

(22) Filed: Aug. 24, 2016

(65) Prior Publication Data

US 2017/0063684 A1    Mar. 2, 2017

(30) Foreign Application Priority Data

Aug. 27, 2015  (EP) .................................... 15182727

(51) Int. Cl.
*H04L 12/28* (2006.01)
*H04L 12/741* (2013.01)
(Continued)

(52) U.S. Cl.
CPC ............ *H04L 45/74* (2013.01); *H04L 5/0055* (2013.01); *H04L 65/4076* (2013.01);
(Continued)

(58) Field of Classification Search
CPC ....... H04L 45/74; H04L 69/16; H04L 5/0055; H04L 65/605; H04L 65/80; H04L 65/4076; H04L 67/02
See application file for complete search history.

(56) References Cited

U.S. PATENT DOCUMENTS

| | | | |
|---|---|---|---|
| 2007/0058629 A1* | 3/2007 | Luft | H04L 67/42 370/390 |
| 2012/0259994 A1* | 10/2012 | Gillies | H04L 12/1881 709/231 |

OTHER PUBLICATIONS

"Software-Defined Networking: The New Norm for Networks," *Open Networking Foundation*, ONF White Paper, Apr. 13, 2012, 12 pages.

(Continued)

*Primary Examiner* — Phuc H Tran
(74) *Attorney, Agent, or Firm* — Hamilton, Brook, Smith & Reynolds, P.C.

(57) ABSTRACT

A system and method are provided for transmitting data via a network. Upon receiving a request for unicast transmission of the data, the system and method respond to the request by i) formatting the data in accordance with a transport protocol to obtain formatted data and ii) providing the formatted data to the network, the formatted data comprising a destination address field. The network is a programmable network comprising one or more forwarding nodes that are remotely controllable. In order to effect a multicasting of the formatted data, the one or more forwarding nodes are controlled to i) replicating the formatted data to obtain replicated formatted data, and ii) setting the destination address field of the replicated formatted data to an address originating from a further request for the unicast transmission of the data. An advantage of the system and method is that multicasting may be provided for 'off-the-shelf' unicast receivers.

15 Claims, 12 Drawing Sheets

(51) Int. Cl.
  *H04L 29/06* (2006.01)
  *H04L 5/00* (2006.01)
  *H04L 29/08* (2006.01)

(52) U.S. Cl.
  CPC ............ *H04L 65/605* (2013.01); *H04L 65/80* (2013.01); *H04L 69/16* (2013.01); *H04L 67/02* (2013.01)

(56) References Cited

OTHER PUBLICATIONS

Clark, Russell J., et al., "Providing Scalable Web Service Using Multicast Delivery," GIT-CC-95-03, Jan. 14, 1995, 19 pages.

European Search Report issued in European Application No. EP/15182727.6, entitled "Multicast Transmission Using Programmable Network," dated Feb. 10, 2016.

Ghobadi, Monia, et al., "Rethinking End-to-End Congestion Control in Software-Defined Networks," Hotnets '12, Oct. 29-30, 2012, Seattle, WA, USA.

Gröndahl, Jan, "Reliable Multicast Transport—The new modular and highly scalable protocols," Helsinki University of Technology T-110.551 Seminar on Internetworking, Apr. 26-27, 2005, 7 pages.

Mullins, Billy, et al. ,"Multicast TCP via Concast Merged Acknowledgements," Department of Computer Science, University of Kentucky, 0-7803-7945-4/03, 2003, IEEE, pp. 305-310.

Talpade, Rajesh, et al., "Single Connection Emulation (SCE): An Architecture for Providing a Reliable Multicast Transport Service," College of Computing, Georgia Institute of Technology, 1063-6927/95, 1995, IEEE, pp. 144-151.

Feamster, Nick, et al., "The Road to SDN: An Intellectual History of Programmable Networks," ACM Queue, vol. 11, No. 12, Dec. 2013, 21 pages.

* cited by examiner

MULTICAST TRANSMISSION USING PROGRAMMABLE NETWORK

RELATED APPLICATION

This application claims priority under 35 U.S.C. § 119 or 365 to EP Application No. 15182727.6, filed Aug. 27, 2015. The entire teachings of the above application are incorporated herein by reference.

TECHNICAL FIELD

The invention relates to a system and method for transmitting data via a network, in particular a programmable network comprising one or more forwarding nodes that are remotely controllable. The invention further relates to a server or controller for use in the system. The invention further relates to a computer program product comprising instructions for causing a processor system to perform the method.

BACKGROUND

It frequently occurs in a network that data is transmitted by a sender to a number of receivers. Such data transmission is also referred to as 'one-to-many' or multicast distribution, but may also take place within the context of 'many-to-many' distribution.

For example, within the context of MPEG-DASH (Dynamic Adaptive Streaming over HTTP), many receivers may simultaneously request the same data (e.g., a DASH segment) using HTTP, possibly at the same time when requesting a live stream. Since HTTP is a unicast mechanism, this delivery is not efficient as it requires the network to have a relatively large transport capacity for what is essentially a transmission of many duplicates of the data. For increasing the efficiency of the data delivery, HTTP caches may be used. However, video sessions use much more data than normal web browsing. As such, relatively large HTTP caches may be needed. Moreover, in the access network, which usually has a tree-like structure with multiple levels, placing HTTP caches too 'low' in the network tree (too nearby the receivers) results in few receivers per HTTP cache, and would thus be quite expensive. Conversely, placing HTTP caches too 'high' in the network tree requires the network to have more transport capacity, which is also quite expensive.

Aside of MPEG-DASH, similar problems occur where many receivers need to be provided with (large amounts of) essentially the same data in a reliable manner. Examples include the delivery of software updates, preloading of media content, etc. The problem may occur in all kinds of (combinations of) networks, e.g., ADSL, DOCSIS, mobile, fiber, etc.

To address the above problem(s), so-termed 'reliable multicasting' techniques have been developed which allow such data to be efficiently distributed within the network. Here, the adjective 'reliable' indicates that the multicasting technique employs a delivery mechanism which, under normal circumstances, ensures the delivery of a packet, and that packets will be delivered in order. An example is multicast Transport Control Protocol (TCP) over Internet Protocol (IP). Another example is File Delivery over Unicast Transport (FLUTE). Disadvantageously, current reliable multicast techniques typically require at least some change in the receiver, and will thus not work with 'off-the-shelf' unicast receivers. Current reliable multicast techniques also do not work with current Hypertext Transfer Protocol (HTTP) mechanisms, as HTTP is used in an interactive unicast fashion. Yet another disadvantage is that existing reliable multicast techniques will be limited in speed, as they have to accept TCP congestion management.

SUMMARY

It would be advantageous to obtain a system or method for multicasting of data which addresses one or more of the above disadvantages.

In accordance with a first aspect of the invention, a method is provided for transmitting data via a network, which may comprise:
 receiving a request for unicast transmission of the data;
 responding to the request by i) formatting the data in accordance with a transport protocol to obtain formatted data and ii) providing the formatted data to the network, the formatted data comprising a destination address field;
wherein the network may be a programmable network comprising one or more forwarding nodes that are remotely controllable, the method further comprising:
 controlling the one or more forwarding nodes to effect a multicasting of the formatted data by:
  i) replicating the formatted data to obtain replicated formatted data, and
  ii) setting the destination address field of the replicated formatted data to an address originating from a further request for the unicast transmission of the data.

In accordance with another aspect of the invention, a computer program may be provided for causing a processor system to perform the method.

In accordance with another aspect of the invention, a system is provided transmitting data via a network, which may comprise:
 a server configured for:
  receiving a request for unicast transmission of the data;
  responding to the request by i) formatting the data in accordance with a transport protocol to obtain formatted data and ii) providing the formatted data to the network, the formatted data comprising a destination address field;
 wherein the network may be a programmable network comprising one or more forwarding nodes that are remotely controllable, the system further comprising:
 a controller for controlling the one or more forwarding nodes to effect a multicasting of the formatted data by:
  replicating the formatted data to obtain replicated formatted data, and
  setting the destination address field of the replicated formatted data to an address originating from a further request for the unicast transmission of the data.

In accordance with other aspects of the invention, a controller and a server are provided for use in the system. The server may comprise the controller.

The above measures involve transmitting data via a network. The data may be transmitted in response to at least one request for unicast transmission of the data. For example, such a request may be issued by an 'off-the-shelf' unicast receiver. In response, the requested data may be formatted, e.g., by a server, in accordance with a transport protocol. The formatted data may then be fed into the network, e.g., by being sent-out from the server towards one or more forwarding nodes of the network.

Even though the request is for unicast transmission of the data, e.g., by being sent during a unicast session between a server and a receiver, a multicasting of the formatted data may be effected. Namely, a programmable network may be used which may comprise one or more forwarding nodes that are remotely controllable, e.g., by a controller. An example of a programmable network is a Software-Defined Network (SDN), as described in, e.g., the white paper 'Software-Defined Networking: The New Norm for Networks', Open Networking Foundation (ONF), Apr. 13, 2012.

The inventors have recognized that such a programmable network may be used to effect a multicasting of the formatted data. Namely, the one or more forwarding nodes may be controlled to replicate the formatted data within the network. Having obtained replicated formatted data, the destination address field of the replicated formatted data may be set to an appropriate address. For example, if following the initial request for unicast transmission of the data, a further request is received for the unicast transmission of the data, the destination address field of the replicated formatted data may be set to an address originating from said further request.

An advantage of the above measures is that a multicasting of data may be effected even if the request, and further requests, may be for unicast transmission of the data. As such, multicasting may be provided for 'off-the-shelf' unicast receivers which may not be specifically configured for reliable multicasting techniques themselves. In particular, a receiver may remain unaware of the data being multicasted to it. Namely, the programmable network may carry out the multicasting such that an (off-the-shelf) receiver may operate as if it were part of a unicast session with the server. Moreover, by replicating the formatted data within the programmable network, less network capacity may be required in the network upstream of the one or more forwarding nodes than if the formatted data were to be already replicated beforehand and thus were to be fed into the network already in replicated form, which is particularly efficient when the data is requested (near) simultaneously by the various receivers.

In an embodiment, the data may be formatted in accordance with Transport Control Protocol (TCP) for use over Internet Protocol (IP). TCP/IP is a reliable transport protocol and may thus provide for the reliable transmission of the formatted data.

In an embodiment, the method may further comprise at least one of:
  generating acknowledgement numbers for packets of the formatted data, and controlling the one or more forwarding nodes to replicate the packets of the formatted data with the acknowledgement numbers so as to obtain a same acknowledgement numbering for packets of the replicated formatted data;
  setting the acknowledgement control bit and the acknowledgement number in the packets of the formatted data and/or the replicated formatted data to zero; and
  controlling the one or more forwarding nodes to adjust the acknowledgement numbers in the packets of the formatted data and/or the replicated formatted data to obtain an acknowledgement numbering which is consistent with the rules for TCP acknowledgements.

The above are different options for dealing with the acknowledgement numbers of packets of the formatted data and/or the replicated formatted data. It is noted that 'consistent with the rules for TCP acknowledgements' refers to the acknowledgement mechanism described in RFC 793 "TRANSMISSION CONTROL PROTOCOL DARPA INTERNET PROGRAM PROTOCOL SPECIFICATION" dated September 1981, e.g., as introduced in Section 2.6 "Reliable Communication", and in particular may refer to providing an acknowledgement number which acknowledges the received TCP packets. This may include further rules on TCP acknowledgements in other RFCs, such as those on selective ACKs, see also RFC 4614 for an overview of various TCP extensions.

In an embodiment, the method may further comprise testing two or more of the options enumerated above one-by-one for a particular request until an acknowledgement message is received (as this may be indicative of a receiver having successfully received and accepted a TCP packet). A particular receiver may, or may not be compatible with each of the above options. As such, two or more of the above options may be tried sequentially until an acknowledgement message is received, e.g., in the order as enumerated as the first two options are most computationally efficient.

In an embodiment, formatting the data to obtain formatted data may further comprise:
  fragmenting, using IP fragmentation, each packet into at least a first fragment comprising the acknowledgement number and a second fragment comprising at least part of the data;
  transmitting the first fragment of each packet by unicast, the first fragment of each packet having an acknowledgement numbering which is consistent with the rules for TCP acknowledgements; and
  providing the second fragment of each packet to the network to be multicast by the one or more forwarding nodes.

The multicasting may thus only be applied to the second fragments comprising the data, whereas the first fragments may be delivered via unicast. Since the first fragments comprise the acknowledgement numbers, these may be generated to correctly indicate the next TCP sequence number value expected by a receiver. Nevertheless, the second fragments, being typically (much) larger in size than the first fragments, may be multicast by the one or more forwarding nodes of the programmable network so as to obtain the earlier mentioned advantages of multicasting.

In an embodiment, the method may further comprise, after responding to the request and/or the further request with a synchronize-acknowledgement message, providing sequence numbers for the packets of the formatted data and/or the replicated formatted data which are consistent with the sequence number of the respective synchronize-acknowledgement message. It is typically desirable to maintain consistency in sequence numbers during a session, e.g., between a server and a receiver, in accordance with TCP. As such, the packets of the formatted data and/or the replicated formatted data may be provided with sequence numbers consistent with the sequence number of a respective synchronize-acknowledgement message.

In an embodiment, the method may further comprise using a same sequence number in each synchronize-acknowledgement message. Instead of using a different sequence number in respective synchronize-acknowledgement messages, as may normally be the case in accordance with TCP, a same sequence number is used. An advantage is that a same sequence numbering may be used for the formatted data and the replicated formatted data. Thus, the sequence numbering of the replicated formatted data may not need to be changed by the one or more forwarding nodes.

In an embodiment, the method may further comprise:
  using a different sequence number in each synchronize-acknowledgement message, and controlling the one or more forwarding nodes to provide sequence numbers for the packets of the formatted data and/or the replicated formatted data which are consistent with the different sequence number of the respective synchronize-acknowledgement message.

In case a different sequence number is used in each synchronize-acknowledgement message in accordance with TCP, the one or more forwarding nodes may be controlled to provide a sequence numbering of the packets of the formatted data and/or the replicated formatted data to be consistent with the different sequence number of the respective synchronize-acknowledgement message, e.g., by adjusting or overwriting existing sequence numbers in the packets.

In an embodiment, the method may further comprise, before providing the formatted data to the network, setting the destination address field of the formatted data to correspond to:
  a receiver address originating from the request for the unicast transmission of the data, or
  a separate address provided for the multicasting by the one or more forwarding nodes.

The formatted data may thus be directed at a (first) receiver requesting the unicast transmission of the data. Alternatively, a separate address may be used. In both cases, the formatted data may be replicated by the one or more forwarding nodes.

In an embodiment, controlling of the one or more forwarding nodes may comprise:
  pre-configuring the one or more forwarding nodes for multicasting before the formatted data is provided to the network; or
  configuring the one or more forwarding nodes for multicasting in response to a first packet of the formatted data being received by said nodes.

An advantage of pre-configuring is reduced network load. An advantage of the triggered configuration is reduced waiting time, and thus complexity, at the server.

In an embodiment, the method may further comprise at least one of:
  in response to a request for retransmission of a packet provided by the multicasting of the formatted data, retransmitting the packet by unicast; and
  in response to multiple requests for retransmission of a packet provided by the multicasting of the formatted data, providing the packet to the network to be multicast by the one or more forwarding nodes.

A server may be provided for use in the system and may be configured for:
  receiving a request for unicast transmission of the data;
  responding to the request by i) formatting the data in accordance with a transport protocol to obtain formatted data and ii) providing the formatted data to the network, the formatted data comprising a destination address field; and
  when receiving a further request for the unicast transmission of the data, communicating with the controller to effect a multicasting of the formatted data so as to provide replicated formatted data in response to said further request.

A controller may be provided for use in the system and may be configured for controlling the one or more forwarding nodes to effect a multicasting of the formatted data by:
  replicating the formatted data to obtain replicated formatted data, and
  setting the destination address field of the replicated formatted data to an address originating from a further request for the unicast transmission of the data.

It will be appreciated that the replicating of formatted data and the setting of the address field may be performed on the same or separate forwarding nodes.

The server may comprise the controller.

It will be appreciated by those skilled in the art that two or more of the abovementioned embodiments, implementations, and/or aspects of the invention may be combined in any way deemed useful.

Modifications and variations of the system and/or the computer program product, which correspond to the described modifications and variations of the method, can be carried out by a person skilled in the art on the basis of the present description.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

These and other aspects of the invention are apparent from and will be elucidated with reference to the embodiments described hereinafter. In the drawings.

Figure 1:
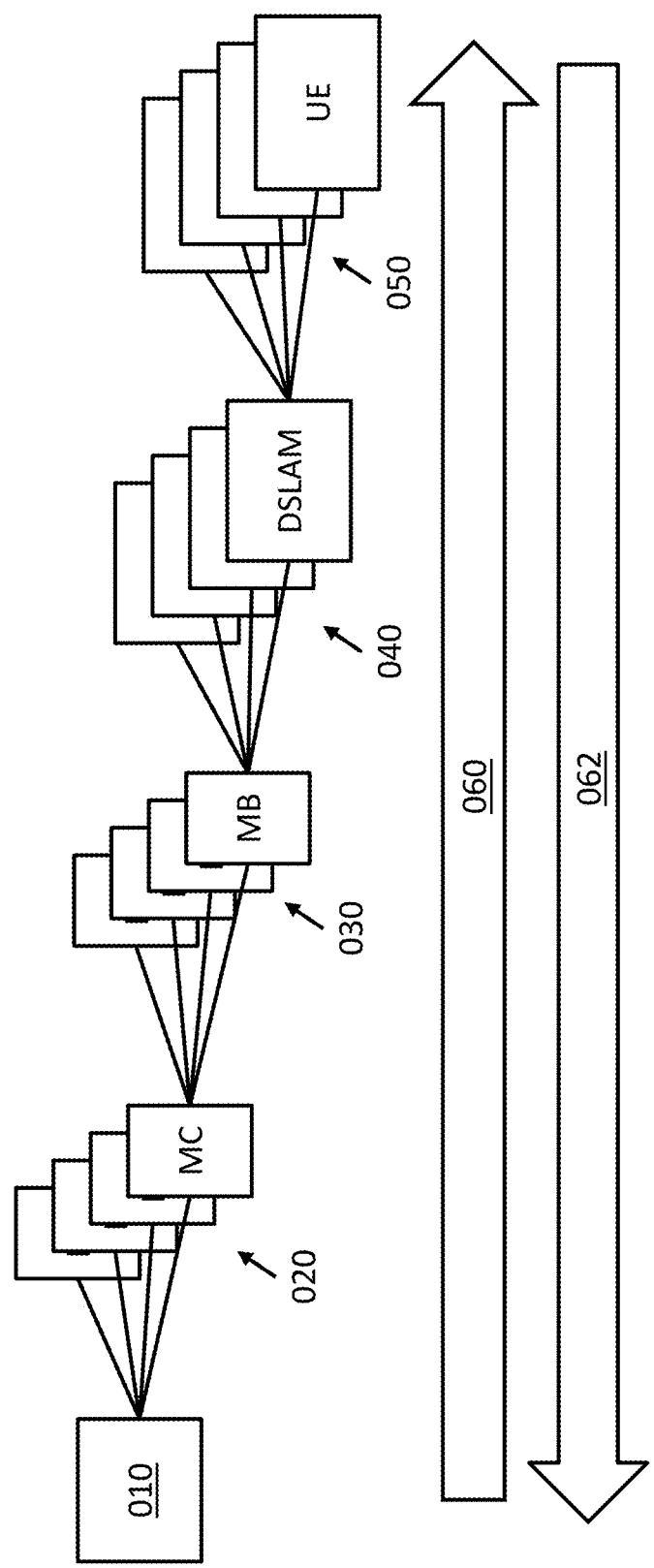
FIG. 1 shows an example network typology.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS

The following list of reference numbers is provided for facilitating the interpretation of the drawings and shall not be construed as limiting the claims.

010 ingest point
020 metro cores
030 metro bridges
040 digital subscriber line access multiplexers
050 receivers
060 fewer receivers per network element
062 more receivers per network element
100 server
110 controller
112 data exchange
120 server/controller node
300 programmable network
310 forwarding node
312 ingress forwarding node
314 egress forwarding node
320 control communication
330 data communication
400 receiver A
410 receiver B
500 request A for data
502 request B for data
510 provide formatted data to network
520 control one or more forwarding nodes
530 replicate formatted data

DETAILED DESCRIPTION

The following embodiments of a system and method involve effecting a multicast transmission of data using a programmable network. As such, multicasting may be provided for 'off-the-shelf' unicast receivers. A general explanation is provided with reference to FIGS. 1 and 2, whereas FIGS. 3-11 show specific embodiments. None of the embodiments is to be understood as representing limitations of the invention.

In the following, the terms 'receiver', 'terminal', 'client' and 'user equipment' (in short also UE) are used interchangeably, referring to a recipient of requested data. Moreover, the term 'stream' is to be understood as a successive number of data packets, together containing the data which is requested by receiver.

FIG. 1 shows an example of a network which has a typical tree-like topology. By way of example, the network of FIG. 1 is shown to be a carrier network of a Digital Subscriber Line (DSL) provider, which comprises an ingest point 010, metro cores 020, metro bridges 030, DSL access multiplexers 040 and receivers 050. There may be a need to provide same data from, e.g., a server upstream of the ingest point 010 (server not shown in FIG. 1), to two or more of the receivers 050. For increasing the efficiency of the (unicast) data delivery, data caches may be used. However, placing data caches too 'low' in the network tree (too nearby the receivers, as illustrated by the arrow 060) results in few receivers per data cache, and would thus be quite expensive. Conversely, placing data caches too 'high' in the network tree (as illustrated by the arrow 062) requires the network to have more transport capacity, which is also quite expensive.

Figure 2:
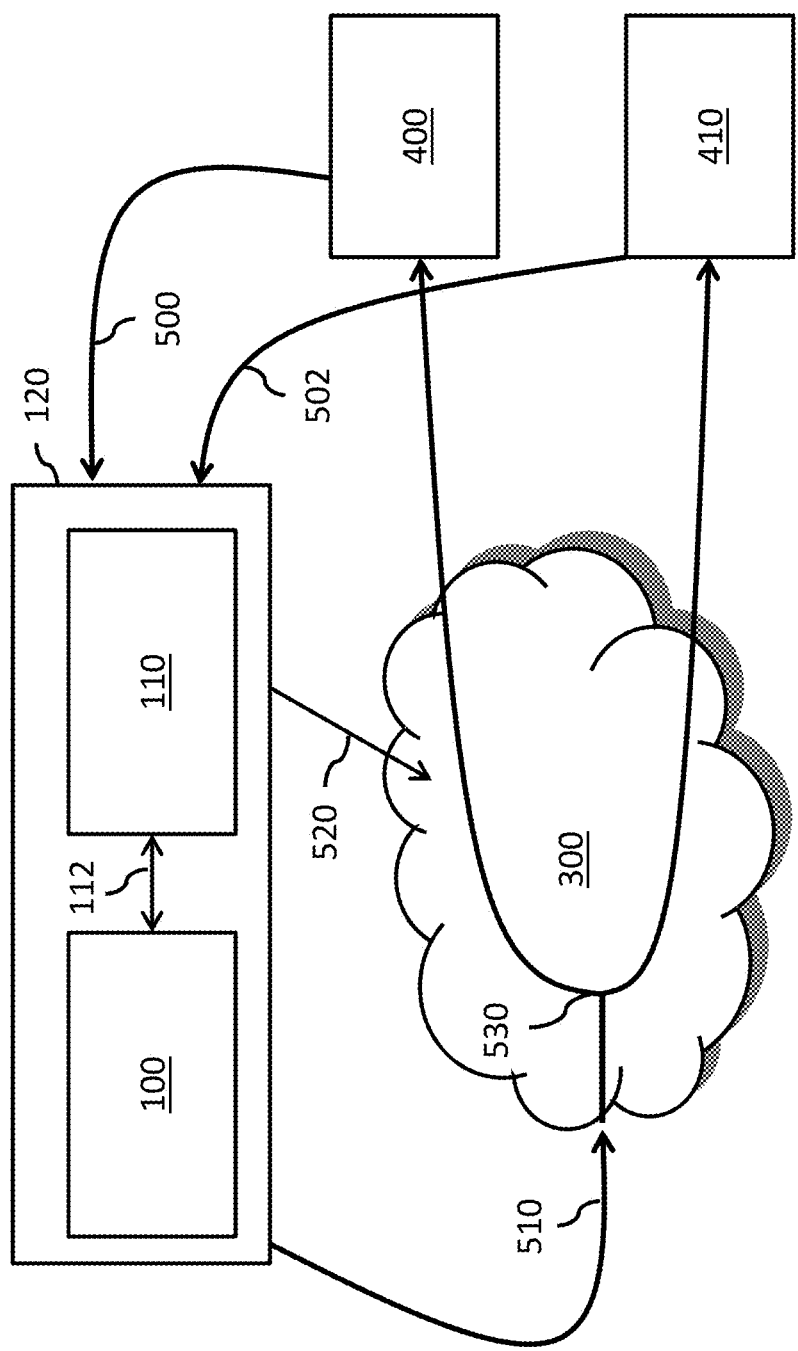
FIG. 2 provides a general overview of a system and method for effecting a multicast transmission of data using a programmable network.

FIG. 2 provides a general overview of a system and method for effecting a multicast transmission of data using a programmable network 300. Shown is a server 100, a controller 110, the programmable network 300, and a first receiver 400, a second receiver 410. By way of example, the server 100 and the controller 110 are shown to be integrated into a single server/controller node 120.

The network 300 is a programmable network comprising one or more forwarding nodes that are remotely controllable. In FIG. 2, and in the following examples, the programmable network is a Software-Defined Network (SDN). However, other types of programmable networks may equally be employed, including but not limited to those programmable networks described in N. Feamster's paper titled "*The Road to SDN. An Intellectual History of Programmable Networks*".

In SDN or other programmable networks, the so-termed control plane (e.g., the routing or intelligence) is moved from routers and centralized in a controller. The routers still take care of the packet forwarding, but under remote control of the controller. As such, the routers now effectively function as forwarding nodes and thus are in the following also referred to as forwarding nodes or, in case of an SDN, SDN nodes. The controller may, per traffic flow, set the forwarding rules of the forwarding nodes. This control may be pre-programmed, or may be dynamically adjusted in real-time. Forwarding nodes may also report monitoring information to the controller, e.g., on bandwidth usage. The controller may thus obtain a complete view of the network, which is useful in deciding how to route packet flows. It is noted that, for reducing the complexity of FIG. 2, the forwarding nodes of the network are not explicitly shown.

The method and operation of the system may involve receiving a request for unicast transmission of the data. For example, the request may be received by the server 100 from the first receiver 400, as indicated by arrow 500. The server 100 may then respond to the request by i) formatting the data in accordance with a transport protocol to obtain formatted data and ii) providing the formatted data to the network, as indicated by arrow 510. The formatted data comprises a destination address field. In response to a further request for the unicast transmission by the data, e.g., as received 502 by the server 100 from the second receiver 410, the one or more forwarding nodes may be controlled, e.g., by the controller 110, to effect a multicasting of the formatted data, with this control being indicated by arrow 520. The one or more forwarding nodes may then replicate 530 the formatted data to obtain replicated formatted data, and set a destination address field of the replicated formatted data to an address originating from the further request, e.g., corresponding to that of the second receiver 410. Moreover, as will be elucidated further on, there may be data communication 112 between the server 100 and the controller 110 within the context of the multicasting.

Effectively, the programmable network 300 may carry out the multicasting such that off-the-shelf unicast receivers may remain unaware of the multicast, in that each receiver may operate as if it were part of a unicast session with the server 100.

It is noted that the request and the further request for the data may be received at approximately the same time, enabling the server 100 to send the data only once to the programmable network 300. However, following an initial request for the data, further request(s) for the data may only be received at a later time. The above multicasting, however, may still be applied. For example, the server 100 may wait a certain period after receiving the initial request for other requests. This and other options are further discussed under 'Additional points and alternatives'.

Figure 3:
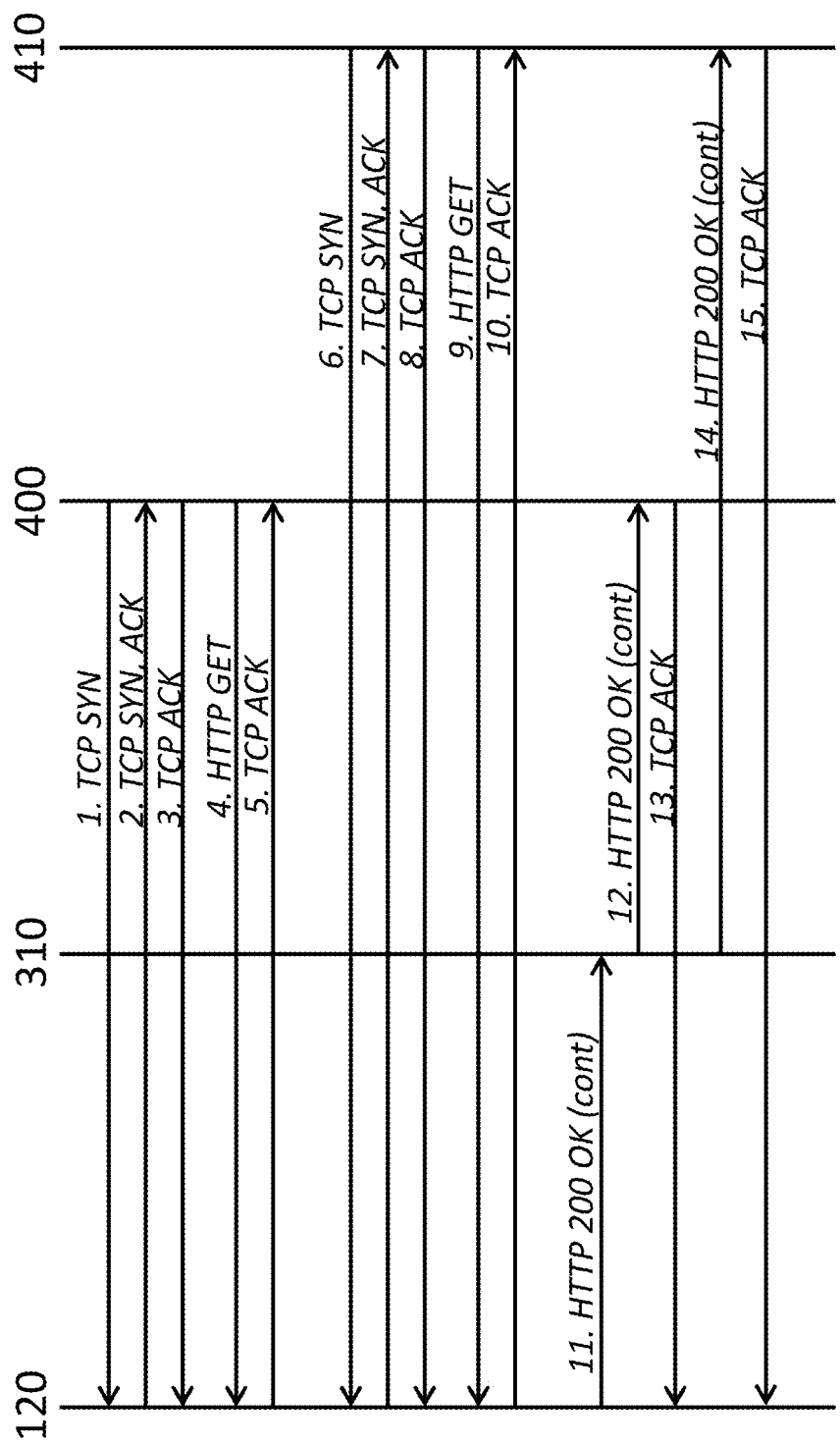
FIG. 3 shows an example message flow in which a multicasting of data is effected by the programmable network to two receivers.

FIG. 3 shows an example message flow in which a multicasting of data is effected by the programmable network to two receivers. Here and in the following, by way of example, the request and subsequent data transmission is HTTP via TCP. It will be appreciated, however, that also transport protocols other than TCP may be used which allow for reliable data delivery. For example, transport protocols such as SCTP (Stream Control Transmission Protocol) and VTP (Venturi Transport Protocol) may be used, which exhibit a similar behaviour to TCP. Also, application protocol other than HTTP may be used, such as SPDY or WebDAV (Distributed Authoring and Versioning).

In the example of FIG. 3, the first receiver 400, henceforth also referred to as receiver A, may request a file. To do this, receiver A may first set up a TCP session with the HTTP server, being in this example part of the server/controller node 120, using the default three-way TCP handshake. After the TCP session is alive, receiver A may send a HTTP GET to retrieve the file. The HTTP server may acknowledge the HTTP GET on the TCP level with a TCP ACK. Note that this message exchange may all be unicast exchange between HTTP server and receiver A. Subsequently, the second receiver 410, henceforth also referred to as receiver B, may request the file in a similar manner as receiver A. The HTTP server may then send out the file, namely as payload in an HTTP 200 OK message, to a forwarding node 310 of the SDN network. The forwarding node 310 may then send this data in step 12 to receiver A. Receiver A may send a TCP ACK back to the HTTP server. The same applies to receiver B in steps 14 and 15. In this way, if, e.g., receivers A and B are on the same DSLAM, and this DSLAM is SDN enabled, the file is only sent once to the DSLAM, and is replicated therein. Note that a HTTP 200 OK may be carried in multiple TCP packets, and thus multiple TCP ACKs may be sent by the receiver. However, for sake of simplicity, this is not shown in FIG. 3.

The following aspects of enabling multicast using a programmable network are henceforth discussed:
1. IP address rewriting
2. ACK numbers
3. TCP congestion management
4. Retransmissions
5. Pre- and triggered-configuration
6. Implementation scenarios 1. IP Address Rewriting Receivers normally only accept IP packets that are addressed to them. As such, if the programmable network were to simply copy the packets, they may all have the same destination IP address. If, for example, the HTTP server were to send the file to receiver A using the IP address of receiver A as destination address, just copying these packets and sending them to receiver B may not work as receiver B will see the IP packets addressed to an unknown destination IP address and may discard them.

An SDN, e.g., using OpenFlow, normally performs multicasting by using a group table: incoming packets are subjected to a group of instructions. The instruction for multicast may be: send to receiver A, next send to receiver B. This group of instructions may be extended by setting, i.e., changing, the destination IP address and the destination TCP port number to correspond to an address of a requesting receiver. These instructions are typically supported by an SDN, e.g. by OpenFlow.

The extended group table may be as follows, assuming the HTTP server sends the packets to receiver A:
1. Forward to receiver A
2. Set destination IP address and TCP port number for receiver B
3. Forward to receiver B By repeating steps 2 and 3, this mechanism can be extended to more than two receivers.

It is noted that the SDN may have to recalculate the TCP checksums when making changes to the packet. TCP checksums are normally calculated using the data of the entire TCP packet, including the TCP headers and a pseudo header which may contain IP addresses, protocol and TCP length. After changing part of the TCP packet, the original checksum should be changed as well. SDN nodes will normally recalculate such checksums when changing IP addresses or port numbers.

2. ACK Numbers

TCP uses sequence numbers to achieve reliability, which allows for the receiver to place TCP packets in the right order, and allows for an acknowledgement scheme to enable retransmission of lost packets. Typically, each TCP packet exchanged, except for the initial SYN packet, contains an acknowledgement (ACK). This ACK contains the next TCP sequence number value expected by the receiver.

Figure 4:
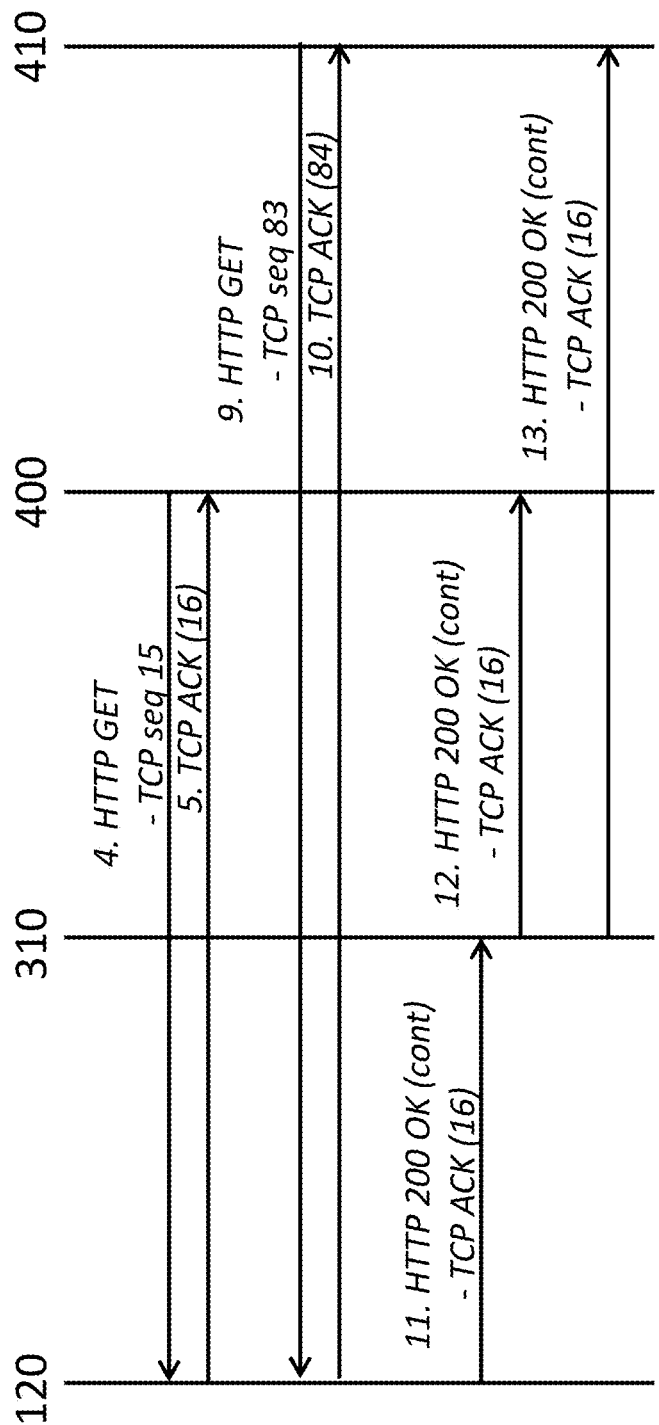
FIG. 4 illustrates acknowledgement numbers in TCP packets.

It is noted that each receiver will typically choose a random starting sequence number. This means that the acknowledgement of the initial HTTP GET, which is carried in one or more TCP packets, may have to differ for each receiver. As such, when copying TCP packets in the network, the ACK in those packets may not be correct except for possibly one receiver. FIG. 4 illustrates how such acknowledgement numbers are generated for receiver A and receiver B. Here, for receiver A, the HTTP GET is carried in a TCP packet with sequence number '15' (note that numbers are selected for readability, rather than TCP's 32 bit sequence numbers). As such, the initial ACK sent to receiver A contains '16' as next expected sequence number. For B, in this example the sequence number is '83' and thus the ACK contains '84'.

In case the HTTP server were to send more data, it typically would continue inserting the next expected sequence number in the TCP packets that carry the HTTP response. As shown in FIG. 4, the HTTP server does so for receiver A, keeping the number '16' in the acknowledgement field. But since this packet is also copied in the SDN network and is sent to receiver B, receiver B receives a TCP packet with a "strange" acknowledgement number, namely that of receiver A, being '16' instead of '84'.

Depending on the rules implemented in the TCP stack, this may or may not be a problem. As such, there exists a number of options on how to deal with acknowledgement numbers in the multicasting of the data in the SDN:

1. The TCP/IP stack at the receiver may simply accept the packets even though the acknowledgement number is wrong. Namely, TCP implementations typically follow a general robustness principle: be conservative in what you do, be liberal in what you accept from others. So, when receiving an invalid acknowledgement number, e.g., an 'Invalid ACK', the receiver may accept the packet anyway. In particular, it is known that certain network equipment, such as that from Cisco, can be configured to either accept or drop such packets having an 'Invalid ACK'. It may therefore not be needed to further correct the acknowledgement numbers in case the receivers are configured for accepting 'invalid ACK's following the initial TCP session setup.

However, the packet may be discarded and a retransmission maybe requested through the TCP retransmission system, leading to another discard, and ultimately to a TCP-session timeout. For that, options 2-4 may be employed.

2. The TCP ACK control bit can be set to '0' by the HTTP server, meaning that the acknowledgement field is not used. Additionally, the acknowledgement number may be set to 0 as well. This is normally only allowed for the initial SYN packet, as for this initial packet there is no TCP packet to acknowledge yet. However, the control bit and acknowledgement number may nevertheless be set to 0. Likewise to option 1, it will depend on the receiver's TCP stack if the receiver will accept the packet.

3. The SDN controller may cause the acknowledgement number to be changed by the forwarding nodes. For example, the SDN controller, having learned from, e.g., the HTTP server, the proper acknowledgement number to be used for each receiver, may send this acknowledgement number to the forwarding node nearest the receiver, with an instruction to, prior to forwarding the packet, replace the acknowledgement number in the packet with the proper acknowledgement number for that receiver. This may involve recalculating the TCP checksum, which incidentally can be performed after having rewritten both the destination IP address and the acknowledgement number. Since the receiver typically does not sent any data to the HTTP server after the initial HTTP GET request, the acknowledgement number to be inserted may be the same for all subsequent TCP packets sent containing the file to be delivered. The SDN controller may instruct the SDN network once with the proper acknowledgement number, upon which the SDN network can replace the number in all TCP packets for a given receiver.

4. IP packet fragmentation may be employed, in which the packets to be sent are fragmented in a small packet containing the IP and TCP header, at least including the acknowledgement number, and a large fragment containing the data. The small fragment may be sent in a unicast fashion to each receiver, whereas the large fragment may be multicasted using the SDN. Since the large fragment does not contain any receiver-specific parts, there is no problem with replicating the large fragment in the SDN with regards to the acknowledgement numbers. Upon receiving the IP packet fragment, the receiver will combine these and will extract the TCP packet which will contain the correct acknowledgement number for that receiver. Note that this form of fragmentation works for both IPv4 and IPv6. IPv6 does not support fragmentation on route, but it does support fragmentation at the source.

Since there are multiple options how to deal with acknowledgement numbers in the multicasting of the data in the SDN, it may be possible to try two or more of these options one by one. The first two options may be the most efficient, so these may be tried first. If no acknowledgements are received for packets sent out like this, the server may determine that these options do not work for a given receiver. The server may thus decide upon option 3 or 4, depending on what the SDN supports, or perhaps depending on the load on the server (as option 3 puts the load in the network and option 4 puts it primarily on the server). Yet another option may be to have the receiver indicate during session setup, or e.g. as part of the HTTP GET as an additional parameter, if the receiver supports either option 1 or 2. It is noted that options 3 and 4 are entirely independent of the configuration of the receiver. Moreover, the TCP/IP stacks on the receivers may be modified or configured to accept option 1 or 2.

3. TCP Congestion Management

TCP has built-in congestion management consisting of a sender choosing a proper sending speed to start with, and slowly (TCP's 'slow start') building up speed. This may be done by keeping track of the proper sending speed through a sending window (also called congestion window, cwnd), which indicates how much data can be sent on the TCP connection at any given time. A receiver may indicate the maximum amount of data it can receive at a certain time (e.g., limited by its buffer capacity), which is called the receiver window (rwnd), used for flow control to prevent a sender from sending too fast for that receiver. Normally, a TCP sender will choose the lower of the two windows (sending window and receiving window), and gradually built up speed by increasing the sending window, up until reaching maximum speed, e.g., using the full receiver window, or until the traffic encounters congestion, noticed by e.g. packet loss (determined through the TCP acknowledgement scheme).

In case of multicasting of the data in the SDN, all receivers may receive the same flow, but TCP flow control may be active per receiver. This may cause the slowest receiver to slow down all flows, or when the sender ignores the receiver window of the slowest receiver, that the flow of data is too much for the slowest receiver. However, this does not need to effect the multicasting technique disclosed in this specification. For example, an SDN typically has a view of the entire SDN network, including bandwidth availability and bandwidth usage. So, the SDN controller typically knows if certain data streams will fit the network, and TCP congestion control may not be needed. In fact, in Content Delivery Networks (CDNs), the amount of network bandwidth is known a priori, and the sender may use a large sending window to start with, e.g., do not do a slow start. Moreover, most receivers nowadays have a large receiver window, as they are adapted to high speed networks anyway. So, most likely the speed with which data can be sent is limited by the network (i.e. using the cwnd) and not by the receiver (i.e. using the rwnd).

4. Retransmissions

Normally, the sending side for TCP has a retransmission timeout for each packet. If a receiver does not acknowledge a certain TCP packet, the sender may retransmit the packet after the timeout. There are various extensions on this, using, e.g., selective acknowledgements and fast retransmission, but they all may amount to the same, namely that reliability is achieved by retransmitting non-acknowledged packets.

For the multicasting technique disclosed in this specification, receivers may acknowledge packets as per the normal case. If the server detects that one receiver has missed a packet, e.g., the retransmission timer for that receiver has expired, it may retransmit the TCP packet using unicast, e.g., as normal during a TCP session.

If the server detects that multiple receivers have failed to receive a TCP packet normally, e.g., that the retransmission timer for multiple receivers has expired, it may also choose to retransmit the packet using multicasting by the programmable network. In this way, the packet may also arrive at receivers that did already receive the packet correctly. This is not a problem, as receivers may drop duplicate packets, being normal behavior for TCP as the acknowledgement may have gotten lost or delayed too much and then the sending side would also retransmit the TCP packet.

5. Pre- and Triggered Configuration

The forwarding nodes may need to be configured to effect the multicasting of the data. Such configuration may be performed as follows:

Pre-configured: the controller may pre-configure the SDN nodes in the network, e.g., after the data has been requested by multiple receivers, but before the data to be multicast is provided by the server to the network Triggered: the SDN nodes forward the first packet of a stream to the SDN controller, and the SDN controller then sets the configuration for that stream in response.

Figure 5:
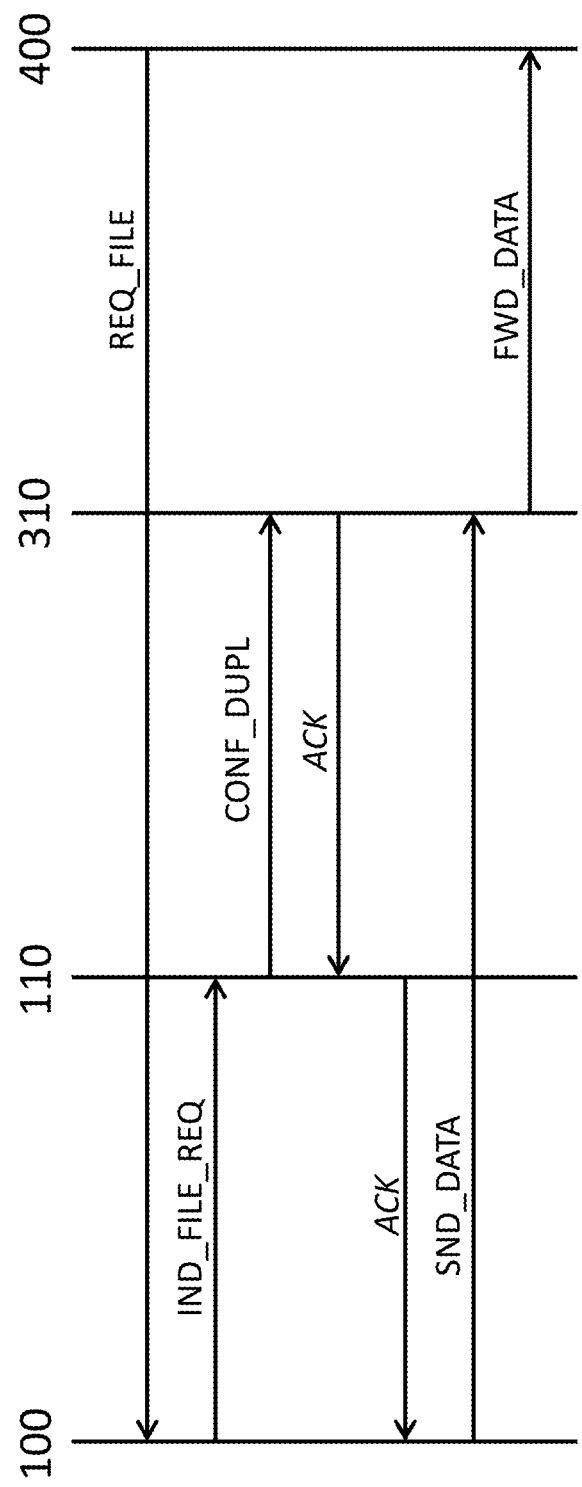
FIG. 5 illustrates a forwarding node being configured by a controller after a server receives a request for a file from a receiver.

FIG. 5 illustrates a forwarding node being pre-configured by a controller after the server 100 receives a request for a file from the first receiver 400, as indicated by a message titled 'REQ_FILE', short for 'Request file'. In this example, the server 100 also receives a further request from a second receiver (not shown in FIG. 5) so that the server 100 may determine that multicasting is appropriate. The server 100 may then indicate to the controller 110 that multicasting is to be performed, e.g., as indicated by a message titled 'IND_FILE_REQUEST', short for 'Indicate file request'. The controller 120 may then configure the forwarding node 310, as indicated by a message titled 'CONF_DUPL', short for 'Configure for duplication', which may be acknowledged to the controller 110 and subsequently the server 100, as indicated by messages titled 'ACK'. Upon receiving the acknowledgement of the pre-configuration having been completed, the server 100 may then start sending the data to the forwarding node 310, as indicated by a message titled SND_DATA', short for 'Send data', and the forwarding node 310 may then carry out the multicasting and subsequently forward the replicated data, as indicated by a message titled 'FWD_DATA', short for 'Forward data'.

Figure 6:
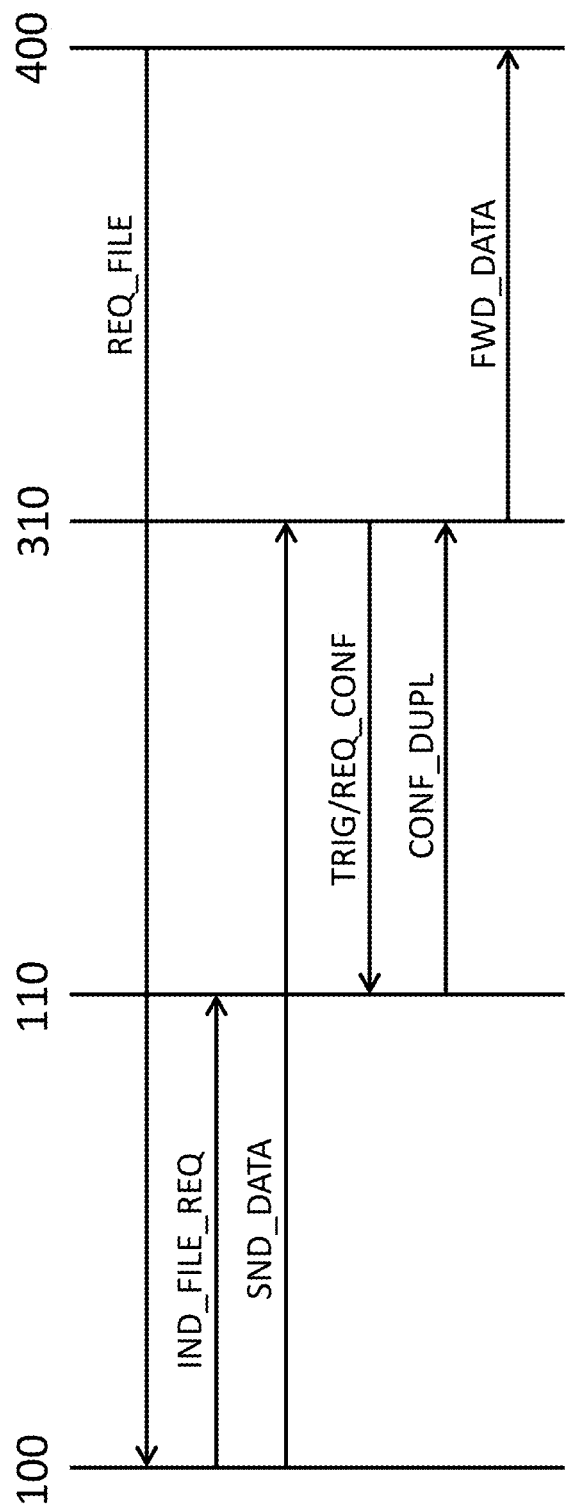
FIG. 6 illustrates the forwarding node triggering a configuration by the controller upon receiving data from the server.

FIG. 6 illustrates the forwarding node 310 triggering a configuration by the controller upon receiving data from the server 100. In this case, the server 100 may indicate the file request to the controller and immediately start sending the data. The forwarding node 310 may now receive packets containing the data, and may detect this as a new stream of data for which it does not have any configuration. The forwarding node 310 may now trigger the controller 110, for example by forwarding the first packet of the stream to the controller 110. Such triggering is indicated in FIG. 6 by a message titled 'TRIG/REQ_CONF', short for 'Trigger/Request configuration'. This may allow the controller 110 to configure the forwarding node 310 on how to handle the stream, namely in this case to send duplicates to the receiver. This is indicated by a message titled 'CONF_DUPL', short for 'Configure for duplication'. It is noted that in this scenario, the forwarding node 310 may have to queue packets belonging to the stream that arrive before it receives the configuration from the controller 110.

6. Implementation Scenarios

There may be different implementation scenarios of the server and controller, which are in the following indicated for a HTTP server and a SDN controller and within the context of TCP. The scenarios include (here, 'default' indicates a lack of modification for the multicasting as described in the present specification):

Scenario A: Combined HTTP Server and SDN controller
Scenario B: Default HTTP server, SDN handles the multicasting
Scenario C: Modified HTTP server, interacting with the SDN controller In each of the scenarios, care may be taken of the following:

1. The TCP sequence numbers may be made consistent. The TCP connection setup is unicast between a receiver and the HTTP server, while the data packets are being multicasted. As such, during the TCP connection setup an initial TCP sequence number may be chosen by the server, but this may be not automatically be consistent with the TCP sequence numbers in the multicasted packets, if for example the stream being multicast was from another initial connection setup. To address this, the server may choose non-random TCP sequence numbers, so that the data packets to all receivers have the same sequence numbering. Alternatively, the TCP sequence numbers may be adjusted in the programmable network, for each receiver. This may follow the earlier described adjustment of acknowledgement numbers in the programmable network for each receiver. Alternatively, a transport protocol may be devised which always starts at particular sequence number, e.g., 1.

2. The data packets are to be multicasted, and as such, data packets should enter the network only once to be then copied (or forked, duplicated, replicated) in the network. As such, it may be needed to arrange for duplication in the network (which may be the same in all scenarios), and making sure that only one stream enters the network. For the latter, several options exist, including but not limited to:

HTTP server only sends the packets once, to the address of one of the receivers
HTTP server only sends the packets once, to an address specifically chosen for SDN multicasting
HTTP server sends packets to each of the receivers, with the network itself dropping unnecessary streams 3. As also indicated earlier, when packets are lost to one or more receivers, these receivers will request their retransmission. Options include:

Retransmit using unicast to each receiver requesting retransmission.
Detect multiple receiver requesting the same retransmission, and retransmit using the SDN multicast.

In the following, each scenario is described while specifically addressing the above three points.

Scenario A: Combined HTTP Server and SDN Controller

Figure 7:
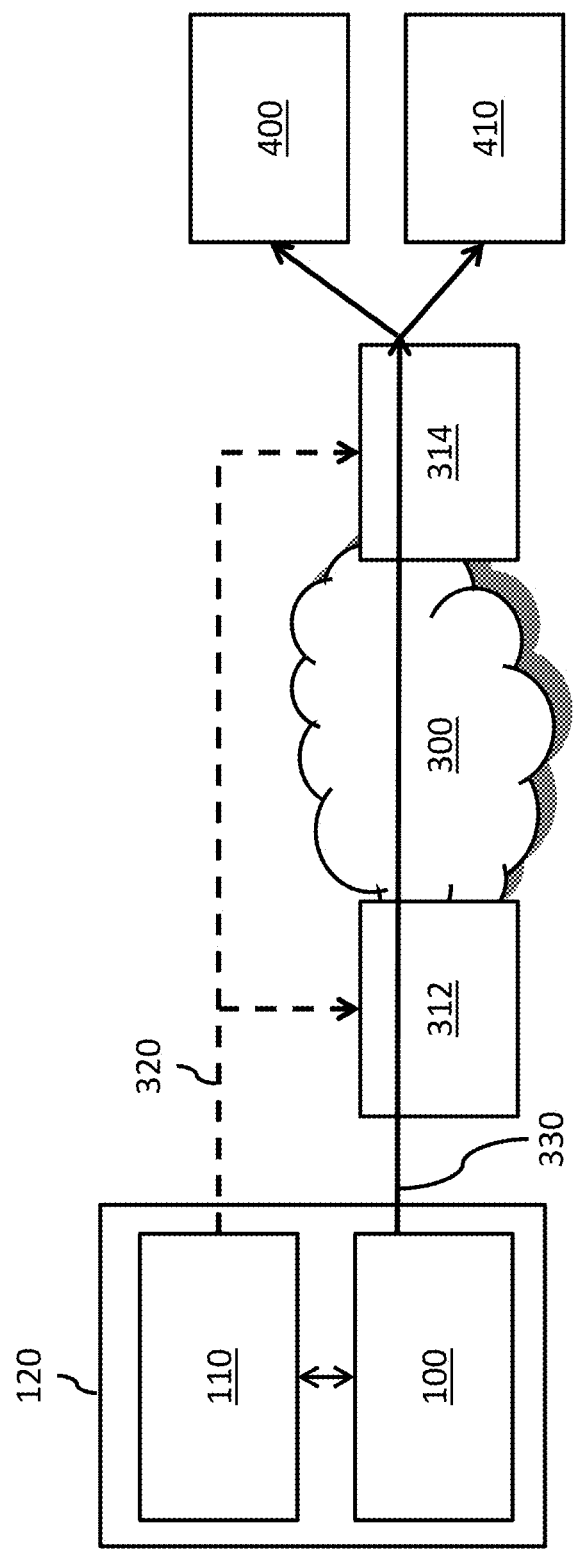
FIG. 7 shows a combined server/controller for effecting a multicast transmission of data using a programmable network.

FIG. 7 shows a combined server/controller 120 for effecting a multicast transmission of data using a programmable network. An advantage of combining the HTTP server and the SDN controller is that the interaction between the two elements is internal, so their cooperation becomes easier: data can be shared, knowledge of one is available to the other. Also, in pre-configured mode, the timing can be agreed upon easily between the two: first the controller component may configure the network properly, and only then the server component may begin to send the data packets.

In FIG. 7, the server/controller 120 is shown to comprise a server component 100 and a controller component 110. Further shown are the programmable network 300, an ingress forwarding node 312, an egress forwarding node 314, a first receiver 400, a second receiver 410, control communication 320 between the controller component 110 and the forwarding nodes, and data communication 330 between the server component 100 and the receivers 400, 410 via the network 300, 312, 314.

For sequence numbering, the server component may choose non-random TCP sequence numbers. Since each receiver may request the same file, the amount of data sent to each receiver may be the same, including the TCP connection setup. Therefore, if the server component chooses the same TCP sequence number to start the TCP connection, this will ensure that the data packets all have the same sequence numbers as well. Thus, when duplicating the data stream to one receiver for another receiver, the sequence numbers used in initiating the TCP connection and sending the data will be correct, i.e. continuous. There is no role for the controller component.

An alternative is that the server component chooses random TCP sequence numbers for each TCP connection it initiates. If not further modified, this may cause the problem that for receivers that receive a duplicate of the data stream, the TCP sequence numbers used by the server towards the receiver may not be correct, i.e. not continuous. Namely, there may be a discontinuity between the TCP sequence numbers used in the (unicast) setup of the TCP connection and the (multicast) TCP packets carrying the actual data. To correct for this, the controller component may instruct the egress forwarding node (the forwarding node closest to the receiver, after which no more duplication of packets will occur) to change the sequence numbers. In this scenario, the controller component may be aware of the sequence numbers used by the server component, e.g. if the server component stores these in a database. The instruction for the sequence numbers may contain two sequence numbers: the one in the original stream and the value it should become. Alternatively, only the difference may be sent, which the forwarding node may add to the original sequence number to arrive at the proper sequence number for the duplicate stream.

With respect to the choosing of non-random sequence numbers, the following is further noted. The TCP sequence number is chosen during the TCP connection setup, at which time it may not be known which file is being requested. After all, the HTTP GET containing the file URL is normally only sent after the TCP connection has been setup. Still, there are various ways of dealing with this:

Choose the same non-random sequence number for each connection, regardless of the file. It is noted that this may have security implications.

Have the URLs pointing to the files contain a unique TCP port number. As such, the port number on which a TCP connection is requested will indicate the file being requested, and the non-random sequence number can be based thereon. This mechanism will be further explained under 'Additional points and alternatives'.

For MPEG-DASH, the files requested are not random: they are chosen in successive order, indicated in the index file (The Media Presentation Description, MPD). As such, the HTTP server generally knows the next file a receiver is requesting, unless the receiver switches to another bitrate and thus to another file, or when multiple files are requested at the same time, but requests overtake each other in the network.

For multicasting the data packets in this scenario, the server component may send the data packets only once, to the address of one of the receivers, e.g., the address of receiver A. The server/controller may then keep track of which receivers have requested the same file, and instruct the forwarding nodes accordingly.

Figure 8:
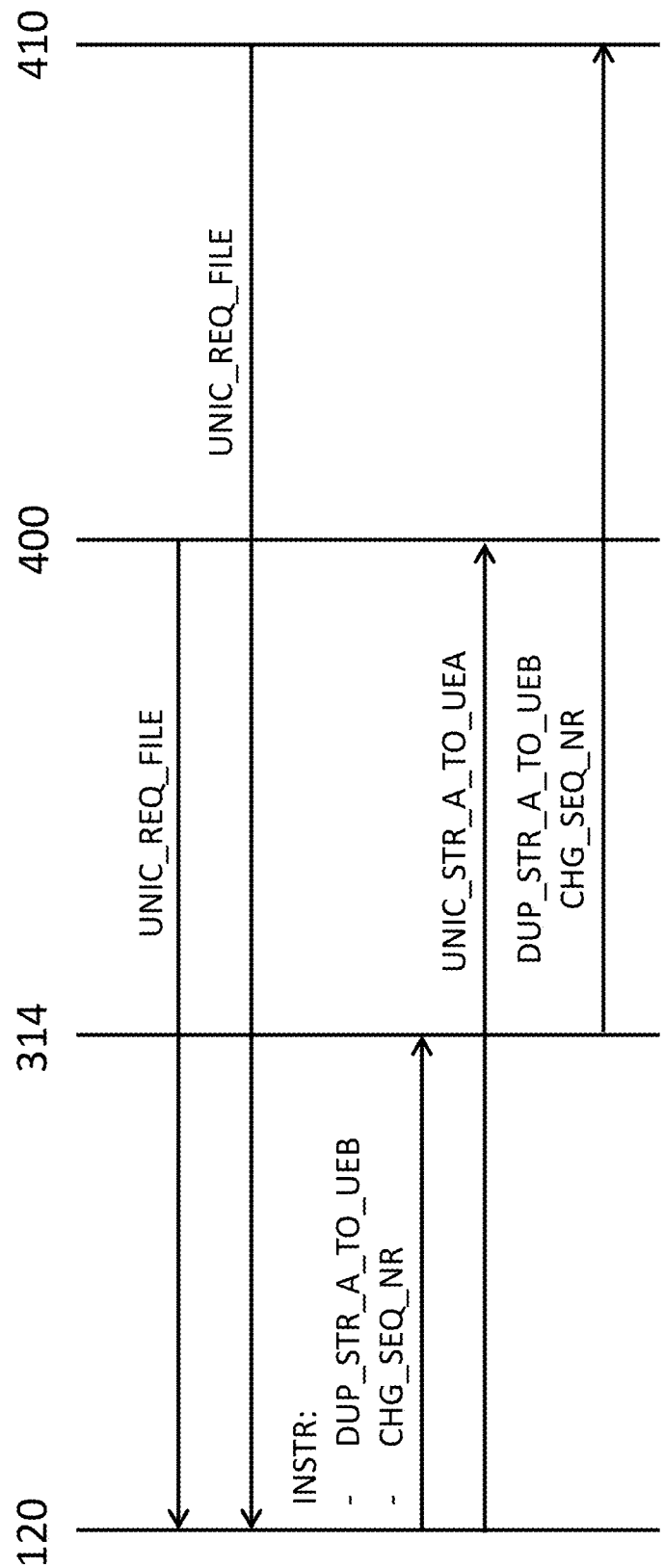
FIG. 8 shows an example message flow of multicasting to two receivers, in which the formatted data is addressed to one of the receivers.

FIG. 8 shows an example message flow of multicasting to two receivers, in which the formatted data is addressed to one of the receivers. Using the address of one of the receivers may be problematic if that receiver, e.g., receiver A, leaves the multicast for some reason, e.g., stops downloading the file. However, in that case, the programmable network may be instructed to filter the data packets and no longer sent them to receiver A, while at the same time sending duplicates to other receivers.

Figure 9:
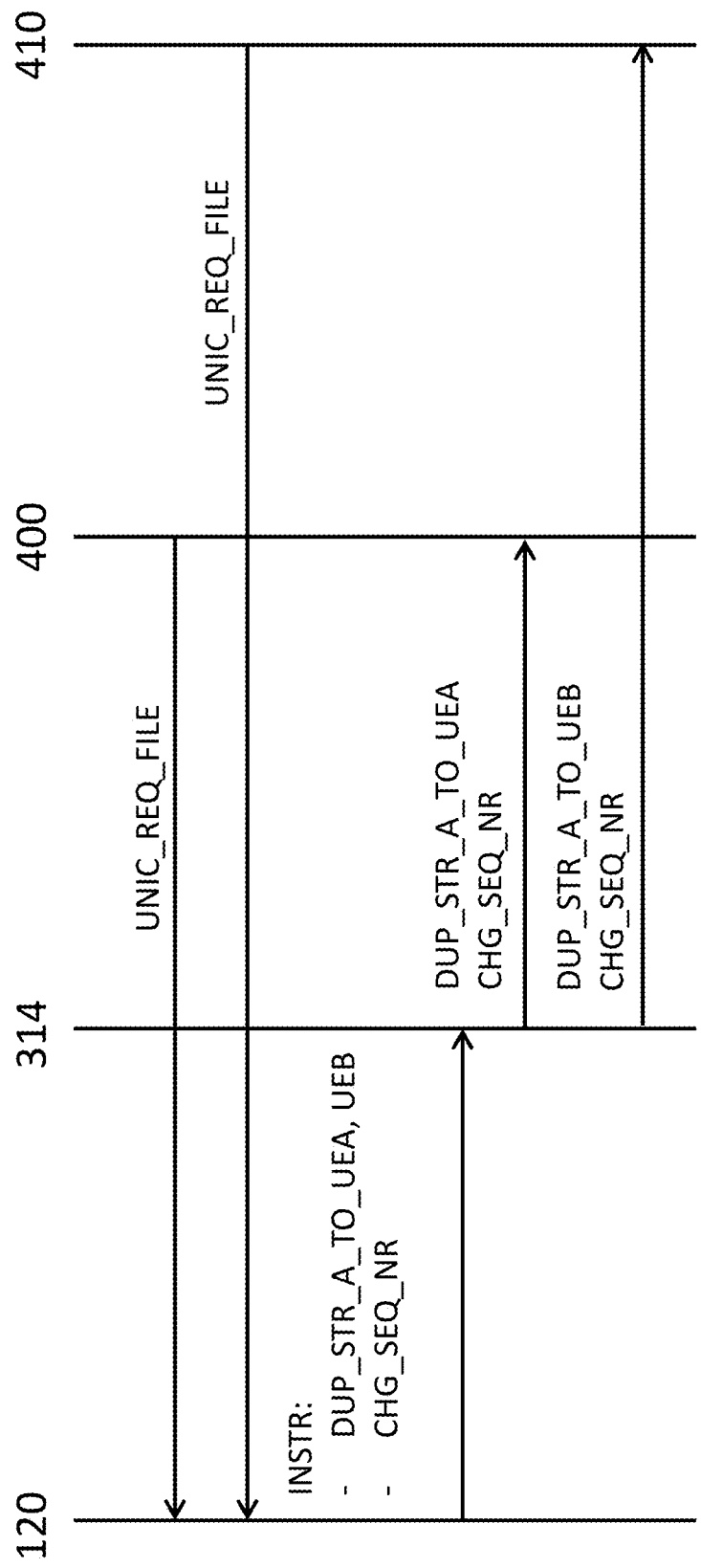
FIG. 9 shows an example message flow of multicasting to two receivers, in which the formatted data is addressed to a separate address for multicasting.

In FIG. 8, the following messages are indicated:
'UNIC_REQ_FILE': Unicast: Request file
'INSTR': Instructions:
DUP_STR_A_TO_UEB': Duplicate stream A to UE B
'CHG_SEQ_NR': Change seq nr
'UNIC_STR_A_TO_UEA': Unicast: stream A to UE A FIG. 9 shows an example message flow of multicasting to two receivers, in which the formatted data is addressed to a separate address provided for multicasting. The messages are abbreviated in a same manner as in FIG. 8, mutatis mutandis. This example concerns the server using an (IP) address specifically for the multicast. This may prevent problems arising when the main receiver (i.e., the first receiver to join the multicast) leaves the session, as indicated in reference with FIG. 8, but may require an additional instruction to the forwarding node to also duplicate packets to the main receiver.

Figure 10:
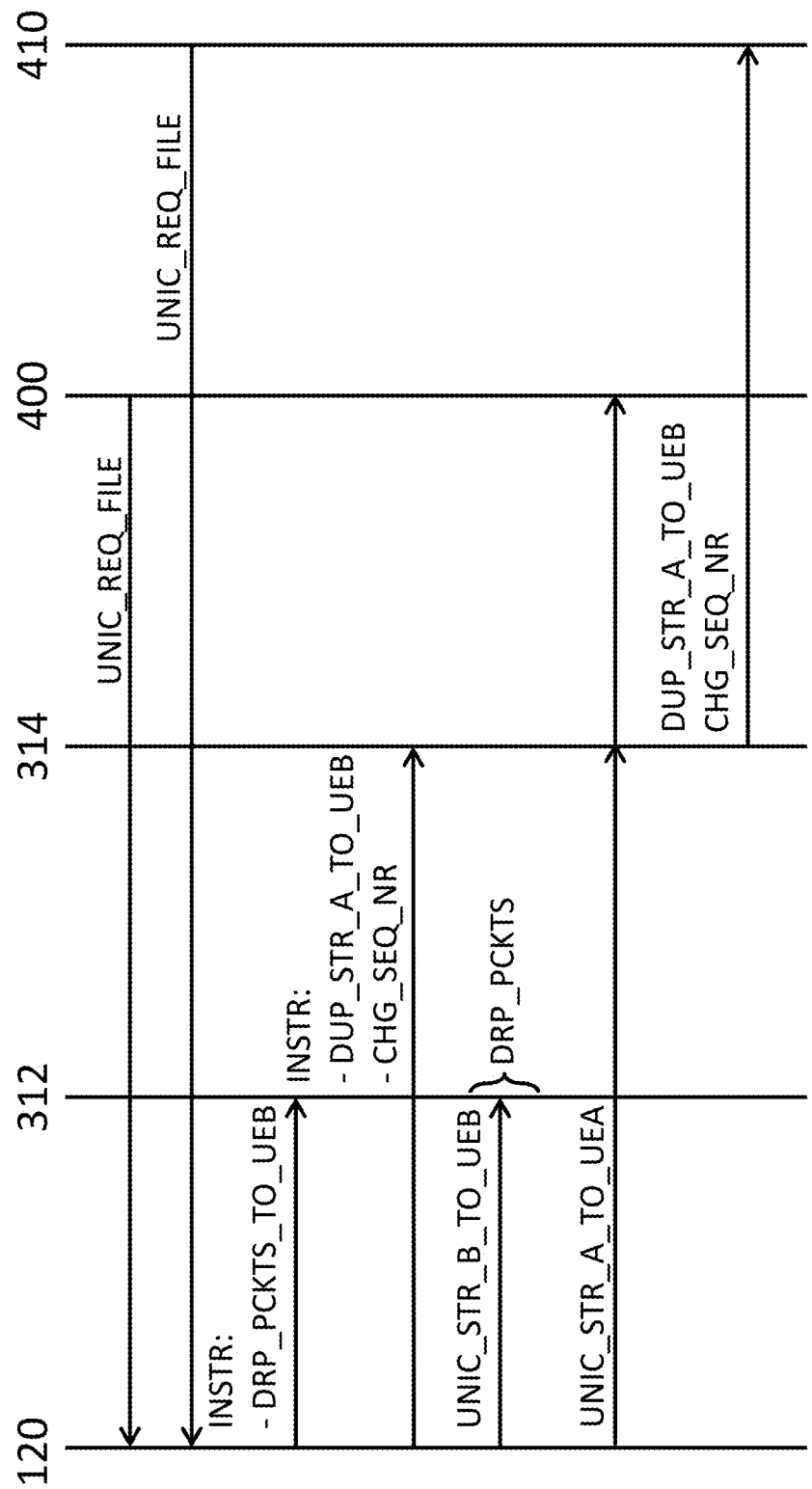
FIG. 10 shows an example message flow, in which data dropping is employed at an ingress node of the programmable network.

FIG. 10 shows an example message flow, in which data dropping is employed at an ingress node of the programmable network. Namely, one way of dealing with multicast is to let the server send the data to all receivers requesting the data, and then control the programmable network to drop data packets at an ingress node of the network where appropriate. The advantage may be that the server does not need to be modified. Alternatively, the server may be combined with a forwarding node as well. The instruction to drop packets may then go to the forwarding node that is co-located with the server. This may prevent packets from entering the network at all, instead of still going to the first forwarding node in the network, e.g., the ingress node.

In FIG. 10, the following messages are indicated:
'UNIC_REQ_FILE': Unicast: Request file
'INSTR': Instructions:
'DRP_PCKTS_TO_UEB': Drop packets to UE B
'DUP_STR_A_TO_UEB': Duplicate stream A to UE B
'CHG_SEQ_NR': Change seq nr
'UNIC_STR_B_TO_UEB': Unicast: stream B to UE B
'UNIC_STR_A_TO_UEA': Unicast: stream A to UE A It is noted that, with respect to retransmission, in the multicast scenario of FIG. 10, when retransmitting a packet to, e.g., receiver B, the retransmission in unicast may fail due to the network being instructed to drop packets to receiver B. As such, it may be desirable not to use unicast retransmission but rather multicast, or to use a workaround. For example, the controller may temporarily instruct the network to stop dropping packets to receiver B, do the retransmission and then instruct the network again to drop packets to receiver B. Another alternative is to arrange for a specific unicast retransmission mechanism in the network. For example, when the server sends the unicast retransmissions using a different address or port number, the forwarding node(s) may be configured to forward these packets to the proper receivers, and the forwarding node(s) may also be configured to perform re-writes of addresses and port numbers to reformat the TCP packet into the original TCP packet again.

Scenario B: Default HTTP Server, SDN Handles the Multicasting

Figure 11:
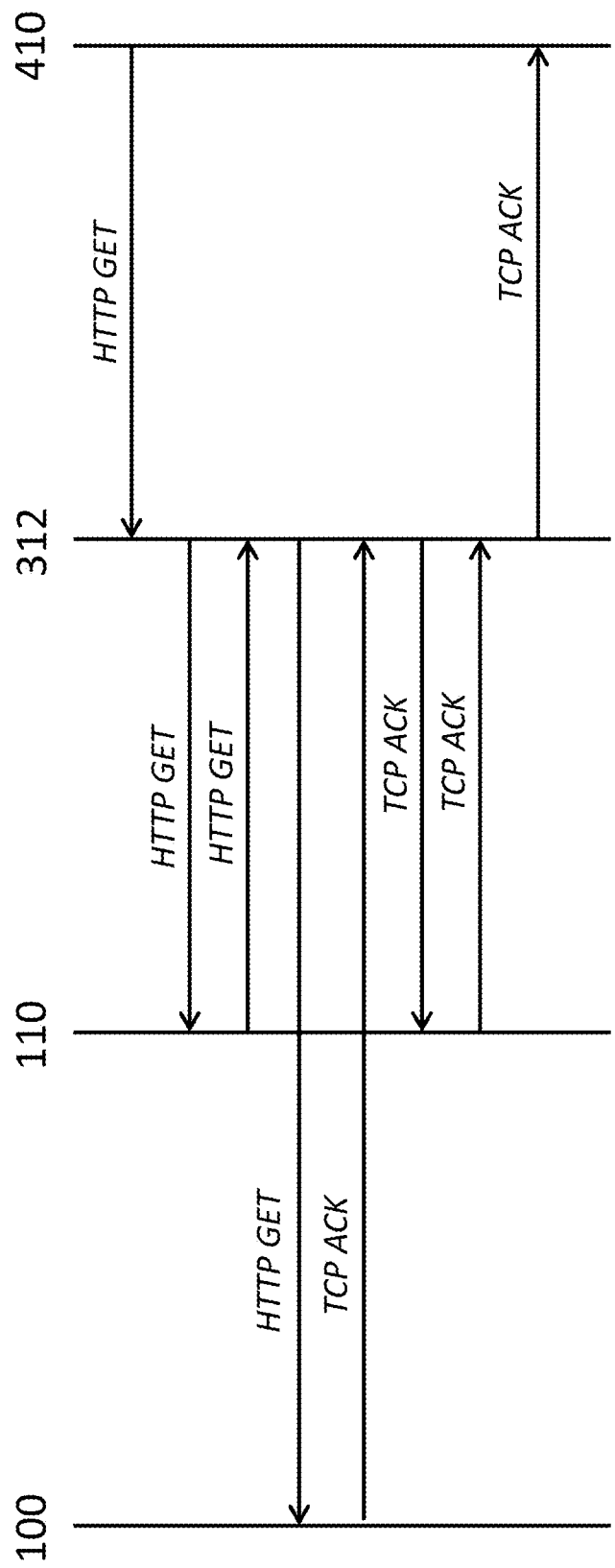
FIG. 11 shows an example message flow, in which the server is a standard server separate from the controller.

FIG. 11 shows an example message flow, in which the server is a standard HTTP server 100 separate from the controller 110. The scenario of the HTTP server 100 being completely default, and the SDN controller 110 being a separate entity, differs from that of scenario A. Namely, the SDN may have to detect that multiple receivers are requesting the same file, and may not rely on information provided by the HTTP server 100 to perform any of its functions in the multicasting.

In FIG. 11, the ingress node 312 is shown to forward all packets for the HTTP server 100 first to the SDN controller 100. In this way, the SDN controller 110 can detect which receivers request the same file, and thus need to receive a copy of the data, and what sequence numbers are used in the TCP connection. The SDN controller 110 may detect the former in the HTTP GET sent by a receiver 410 as a request to the HTTP server 100. Namely, in this HTTP GET, the URL of the file appears, indicating what the request is for. Note that the message flow of FIG. 11 occurs after the TCP connection is setup, and thus after the TCP sequence numbers are assigned. The HTTP GET from the receiver 410 to the HTTP server 110 thus contains the sequence numbers used by the HTTP in the ACK field, since the ACK field contains the next expected sequence number. The SDN controller 110 may thus use this information to derive the sequence numbers to be used in the streams.

For sequence numbering, the most desirable option is to correct the sequence numbers in the network. This option is similar to that of scenario A. The use of non-random sequence numbers is a less desirable option. In principle, the SDN may change the sequence number from the initial TCP connection setup. However, during the TCP connection setup it is not yet known which file is being requested. To address this, all TCP connections may receive the same TCP starting sequence number from the SDN, meaning any and all TCP connection with the server, not only for a file which needs to be multicasted. Another option is to dabble in, e.g., the port numbers: if each file URL also contains a uniquely chosen TCP port number, the TCP port number could then be used to detect which file is being requested by a particular receiver. In that case, the sequence numbers can already be adjusted during the TCP connection setup.

For effecting the multicast, scenario B may use the third option, namely the HTTP server sending packets to each of the receivers, with the network itself dropping unnecessary streams, similar to as described for scenario A. The HTTP server may thus send unicast data packets to all receivers requesting the file. The SDN network may then actively drop packets for all streams but a smaller number of streams, preferably one, and duplicate the one stream to all receivers requesting the file.

Note that in this scenario, the SDN controller cannot coordinate with the HTTP server to wait with sending data until the SDN nodes are instructed properly. As such, in this scenario, the 'triggered' mode of operation may have to be used. Namely, if the 'pre-configured' mode would be used, all sessions would start with the unicast delivery to all receivers, and only after the SDN controller configures the SDN nodes would the system switch to multicast. Although this may work, it will be less efficient than triggered mode, and the configuring of the SDN nodes is more complex. This may be due to the dropping and duplication actions having to be synchronized, to prevent packets from being dropped and not yet duplicated, resulting in missing packets for certain receivers, or duplicated and not yet dropped, resulting in double packets.

With respect to retransmissions, because the HTTP server is separate from the SDN controller, the SDN controller may not be aware of the retransmissions. However, as the HTTP server will just use the unicast connection to each receiver for retransmission to that receiver, this means that the SDN network may have to identify, i.e., become aware of, retransmissions. This can be carried out by having retransmission requests sent to the SDN controller, which can instruct the SDN forwarding nodes to not filter-out the retransmissions, e.g., by having the SND forwarding nodes check for sequence numbers.

Scenario C: Modified HTTP Server, Interacting with the SDN Controller

This scenario is similar to scenario A, but involves explicit signaling between the HTTP server and the SDN controller.

For sequence numbering, the following options may be used:
Use of non-random sequence numbers, as in scenario A.
Fixing of the sequence numbers in the network. To accomplish this, the HTTP server may inform the SDN controller on the relationship between the sequence numbers in the stream to be multicasted and the sequence numbers in the streams to the other receivers.

As the HTTP server may inform the SDN controller about which streams are to be sent to which receivers (see below), the information on sequence numbers can be part of that signaling as well.

For multicasting, the following options may be used:
Use of an (IP) address of one of the receivers. This is similar to scenario A. However, the HTTP server may have to signal to the SDN controller which streams have to be forwarded to which of the receivers. Also, information on sequence numbers used could be included in the signaling.
Use of a dedicated (IP) address specifically for the multicast. This is similar to scenario A, but the HTTP server may have to signal to the SDN controller which streams have to go to which of the receivers. Also, information on sequence numbers used could be included in the signaling.

Essentially, in the abovementioned two options, the HTTP server may signal the start and end of each data stream to each receiver, and include information on sequence numbers. Below is an example of the information that may be signaled:

TCP stream A
Stream sent into the network:
UE A (IP source, port source, IP destination, port destination, starting TCP sequence number)
Streams to be formed in the network:
UE B (IP source, port source, IP destination, port destination, starting TCP sequence number)
UE C (IP source, port source, IP destination, port destination, starting TCP sequence number)
etc.

As a third option for multicasting, the HTTP server may send all TCP streams in unicast to all receivers. This is also similar to the third option in scenario A. The information to be sent to the SDN controller may be similar to the information for the first two options, but here only the information on all unicast streams sent is to be included. The SDN controller may then choose which stream to keep and duplicate, and which streams to drop at the ingress point of the programmable network.

Retransmission in scenario C is also similar to that of scenario A. Essentially, retransmission may be performed by the HTTP server, without a need for signaling to the SDN controller. Note that for retransmission, it may be easiest to use multicast retransmission, using a single destination IP address by the HTTP server.

Additional Points and Alternatives

It is noted that the HTTP server does not need to directly send the content to the first receiver requesting it. Rather, the HTTP server may be aware, or expect, that multiple receivers will request the same file. This may be the case in, e.g., live MPEG-DASH, where many receivers are requesting the same segments. As such, the HTTP server may wait a certain period before sending out the segments, without causing immediate timeouts (which would lead to clients re-requesting the segments). For example, in case of segments being 1 second length, the HTTP server may wait for 0.5 or even 1 second before sending the segment. By waiting, the HTTP server is likely to have received more requests from receivers. This allows the server to send it once and have the programmable network replicate it for many receivers, albeit at the slight cost of some delay before delivering the file to at least some of the receivers.

It is further noted that the initial ACK may be sent normally, but does not have to. In the latter case the receiver will retransmit the HTTP GET request unnecessarily.

For live MPEG-DASH, in the Media Presentation Description (MPD), each segment is normally given an availability start time and an availability end time. This allows various receivers to all request the same segments at approximately the same time, and thereby ensures that live MPEG-DASH is actually live. The information from the MPD may be used to determine when segments will no longer be requested, e.g., after availability end time, at which point the multicast may be performed.

Nowadays, most receivers are adapted for high speed networks and thus have larger receiver windows. As such, the receiver is unlikely to be the bottleneck in any network transmission received. However, in the unlikely event that the receiver is the bottleneck, the server may take this into account and leave a certain receiver out of the multicast and instead use unicast, or start a parallel lower-speed multicast in case multiple receivers are all in the same situation of representing a bottleneck.

If a receiver is requesting a segment a bit too late for joining the multicast, e.g. when joining an ongoing live MPEG-DASH session, the receiver may still join the multicast from the point where it joins. The receiver may then be lacking a number of TCP packets, namely from the start of the multicast up to the time the receiver joined the multicast. However, the missing TCP packets may be retrieved using the regular retransmission mechanism in TCP, and/or the server may actively send the TCP packets in a unicast fashion towards this receiver. For example, in case of MPEG-DASH, which consists of a number of subsequent segments, if the first segment is missed, it may be sent by unicast, after which the receiver joins the multicast.

Instead of selecting the address of one of the receivers or a multicast address for sending the file through the programmable network, also a dummy address may be used. An advantage of a dummy address may be that, in case the original destination receiver would leave the multicast, there is no need to change address half-way through a session. Namely, a multicast address can be used for efficiency in the network, if not all nodes in the network are SDN forwarding nodes, but e.g. only the nodes on the edges of the network are SDN forwarding nodes. Using the (IP) multicast address enables the non-SDN network to route the data packets efficiently to all SDN forwarding nodes on the edges of the network. Before forwarding the data to the receivers, these SDN forwarding nodes can then replace the (IP) multicast address with the destination IP address of the receiver.

With respect to the choosing of non-random sequence numbers, the following is further noted. The initial TCP sequence number is chosen during the TCP connection setup, at which time it may not be known which file is being requested. Namely, the HTTP GET containing the file URL is normally only sent after the TCP connection has been setup. This may be seen when considering FIG. 3. In setting up a TCP connection, the server 120 chooses the initial TCP sequence number when sending the TCP SYN, ACK. The server 120 preferably chooses the same initial TCP sequence number for the TCP connection with different receivers 400, 410. Namely when doing this, and when subsequently duplicating the TCP packets carrying the HTTP 200 OK, the TCP sequence number will automatically be the same for the different receivers 400, 410, as the packets are duplicates. As such, the server 120 may choose the same initial TCP sequence number for the TCP connections to multiple receivers 400, 410. However, the data being requested is not known yet, as this is only indicated in the subsequent HTTP GET. There are various ways of dealing with this, including but not limited to:

Choose the same non-random sequence number for each TCP connection, regardless of the file being requested. This may have security implications, as the TCP sequence number is normally chosen randomly as a means to counter certain possible security problems. Nevertheless, this may for some situations be acceptable.

Figure 12:
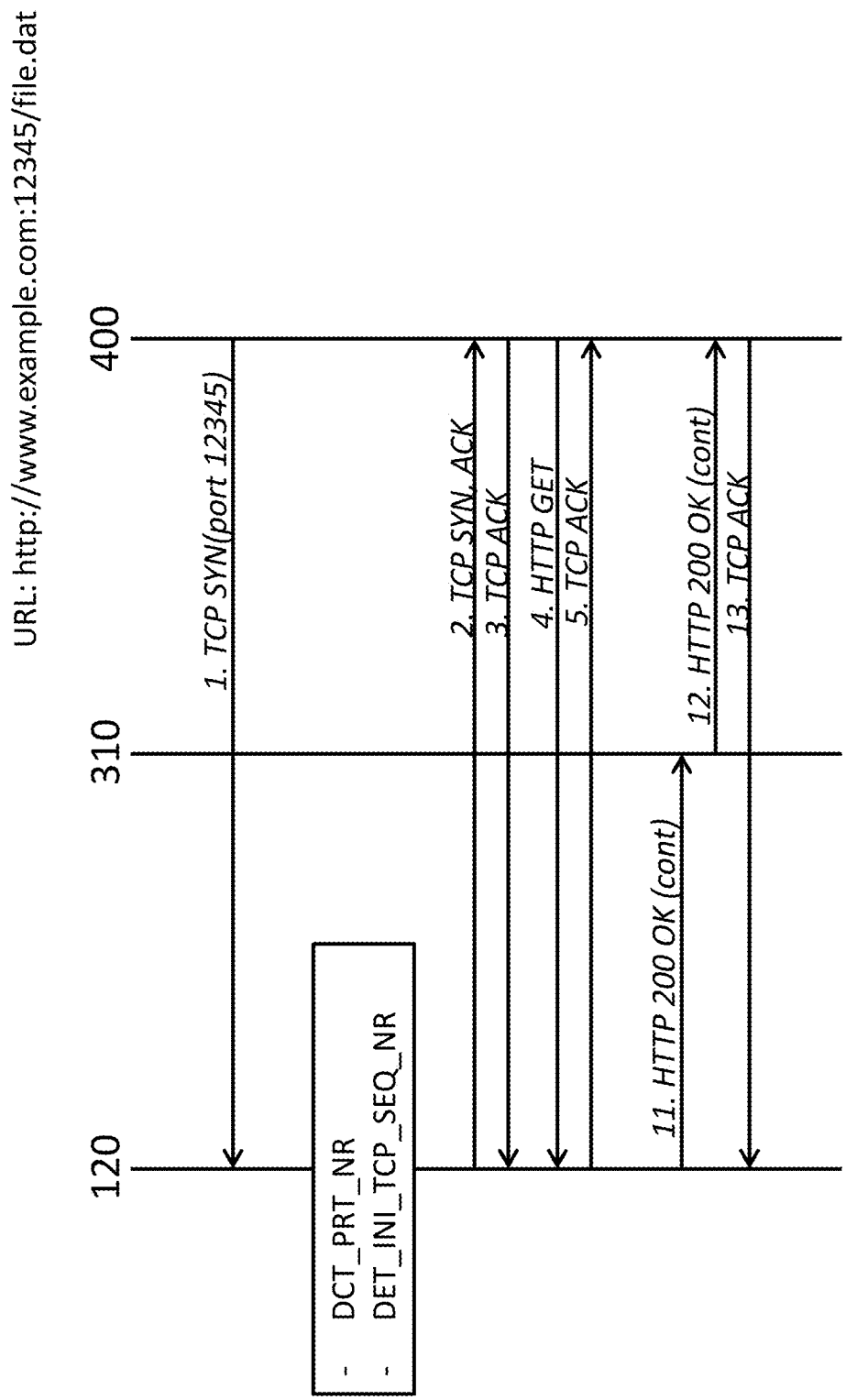
FIG. 12 shows an example message flow, in which a receiver indicates to the server during setup of a TCP connection the file that is being requested.

To prevent complete non-randomness, sequence numbers may be chosen the same for requests for a same file (e.g., data item), but differently, e.g., randomly, between different files. Normally, the file being requested is only indicated in the HTTP GET. To choose sequence numbers the same for requests for a same file, the file may need to be indicated earlier in the packet exchange, so as to be able to determine the TCP sequence number based on the file being requested. FIG. 12 shows an example how this can be accomplished. The receiver 400 may, via a known mechanism, have an URL referring to a file to be requested by the receiver. Normally, the default TCP port for HTTP is port 80. Thus, for URLs not containing a specific port number, TCP port 80 will be used. But, URLs can also contain a different port number to be used, in this example the destination TCP port 12345. When the URL contains such a port number, the receiver will send its TCP packets to this port number, starting with the first TCP SYN message. The server 120 can detect this port number, as indicated by 'DCT_PRT_NR', short for 'Detect Port Number', in FIG. 12. The server may then determine the initial sequence number based on the port number, as indicated by 'DET_IN-I_TCP_SEQ_NR', short for 'Determine Initial TCP Sequence Number', in FIG. 12. To do this, the server 120 may store the combination of port number and initial sequence number, e.g. when the first request on a port arrives. If a unique port number (for each file on that server that is to be multicasted) is inserted in the URLs that are distributed to the receivers, this allows the server 120 to lookup this initial sequence number and thus use the same initial sequence number for subsequent requests on the same port, i.e., for requests for the same file.

For MPEG-DASH, the files requested are not random: they are chosen in successive order, indicated in the index file (The Media Presentation Description, MPD). As such, the HTTP server generally knows the next file a receiver is requesting, unless the receiver switches to another bitrate and thus to another file, or when multiple files are requested at the same time, but requests overtake each other in the network.

Other General Aspects

It is noted that the server, controller or the combined server/controller may be embodied as, or in, a single device or apparatus. The device or apparatus may comprise one or more microprocessors which execute appropriate software. The software may have been downloaded and/or stored in a corresponding memory, e.g., a volatile memory such as RAM or a non-volatile memory such as Flash. Alternatively, the implementation may be in the form of programmable logic, e.g., as a Field-Programmable Gate Array (FPGA). In general, the implementation may be in the form of a circuit. It is noted that the server, controller or the combined server/controller may also be implemented in a distributed manner, e.g., involving different devices or apparatuses. For example, the server or controller may be implemented as a software-based function being performed by entities within a network, possibly using a cloud infrastructure in which the entities are configurable computing resources of the cloud. In case of a peer-to-peer implementation, such entities may be user equipment.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A method of transmitting data via a network, the method comprising:
   receiving a request for reliable unicast transmission of the data;
   responding to the request by i) formatting the data in accordance with a reliable transport protocol that allows for reliable data delivery using delivery acknowledgements to obtain formatted data and ii) providing the formatted data to the network, the formatted data comprising a destination address field;
   wherein the network is a programmable network comprising one or more forwarding nodes in which rules for replicating data are remotely programmable, the method further comprising:
   controlling the one or more forwarding nodes to effect a reliable multicasting of the formatted data by:
      i) replicating the formatted data to obtain replicated formatted data,
      ii) setting the destination address field of the replicated formatted data to an address originating from a further request for the reliable unicast transmission of the data, and
      iii) setting the acknowledgement number of the replicated formatted data such that it results in a consistent delivery acknowledgement to the one or more forwarding nodes.

2. The method according to claim 1, wherein the data is formatted in accordance with Transport Control Protocol (TCP) for use over Internet Protocol (IP).

3. The method according to claim 2, further comprising at least one of:
   generating acknowledgement numbers for packets of the formatted data, and controlling the one or more forwarding nodes to replicate the packets of the formatted data with the acknowledgement numbers so as to obtain a same acknowledgement numbering for packets of the replicated formatted data;
   setting the acknowledgement control bit and the acknowledgement number in the packets of the formatted data and/or the replicated formatted data to zero; and
   controlling the one or more forwarding nodes to adjust the acknowledgement numbers in the packets of the formatted data and/or the replicated formatted data to obtain an acknowledgement numbering which is consistent with the rules for TCP acknowledgements.

4. The method according to claim 3, further comprising testing two or more of the options enumerated in claim 3 one-by-one for a particular request until an acknowledgement message is received.

5. The method according to claim 2, wherein formatting the data to obtain formatted data further comprises:
   fragmenting, using IP fragmentation, each packet into at least a first fragment comprising the acknowledgement number and a second fragment comprising at least part of the data;
   transmitting the first fragment of each packet by unicast, the first fragment of each packet having an acknowledgement numbering which is consistent with the rules for TCP acknowledgements; and
   providing the second fragment of each packet to the network to be multicast by the one or more forwarding nodes.

6. The method according to claim 2, further comprising, after responding to the request and/or the further request with a synchronize-acknowledgement message, providing sequence numbers for the packets of the formatted data and/or the replicated formatted data which are consistent with the sequence number of the respective synchronize-acknowledgement message.

7. The method according to claim 6, further comprising using a same sequence number in each synchronize-acknowledgement message.

8. The method according to claim 6, further comprising:
   using a different sequence number in each synchronize-acknowledgement message, and
   controlling the one or more forwarding nodes to provide sequence numbers for the packets of the formatted data and/or the replicated formatted data which are consistent with the different sequence number of the respective synchronize-acknowledgement message.

9. The method according to claim 1, further comprising, before providing the formatted data to the network, setting the destination address field of the formatted data to correspond to:
   a receiver address originating from the request for the reliable unicast transmission of the data, or
   a separate address provided for the multicasting by the one or more forwarding nodes.

10. The method according to claim 1, wherein the controlling of the one or more forwarding nodes comprises:
    pre-configuring the one or more forwarding nodes for multicasting before the formatted data is provided to the network; or
    configuring the one or more forwarding nodes for multicasting in response to a first packet of the formatted data being received by said nodes.

11. The method according to claim 1, further comprising at least one of:
    in response to a request for retransmission of a packet provided by the multicasting of the formatted data, retransmitting the packet by unicast; and
    in response to multiple requests for retransmission of a packet provided by the multicasting of the formatted data, providing the packet to the network to be multicast by the one or more forwarding nodes.

12. Computer program product comprising instructions for causing a processor system to perform the method according to claim 1.

13. A system for transmitting data via a network, the system comprising:

a server configured for:
    receiving a request for reliable unicast transmission of the data;
    responding to the request by i) formatting the data in accordance with a reliable transport protocol that allows for reliable data delivery using delivery acknowledgements to obtain formatted data and ii) providing the formatted data to the network, the formatted data comprising a destination address field;
wherein the network is a programmable network comprising one or more forwarding nodes in which rules for replicating data are remotely programmable, the system further comprising:
    a controller for controlling the one or more forwarding nodes to effect a reliable multicasting of the formatted data by:
        replicating the formatted data to obtain replicated formatted data, and
        setting the destination address field of the replicated formatted data to an address originating from a further request for the reliable unicast transmission of the data, and
        setting the acknowledgement number of the replicated formatted data such that it results in a consistent delivery acknowledgement to the one or more forwarding nodes.

14. A controller configured for use in a system for transmitting data via a network, wherein the network is a programmable network comprising one or more forwarding nodes in which rules for replicating data are remotely programmable, the system comprising a server configured for:
    receiving a request for reliable unicast transmission of the data;
    responding to the request by i) formatting the data in accordance with a reliable transport protocol that allows for reliable data delivery using delivery acknowledgements, to obtain formatted data and ii) providing the formatted data to the network, the formatted data comprising a destination address field;
wherein the controller comprises a processor configured for controlling the one or more forwarding nodes to effect a reliable multicasting of the formatted data by:
    replicating the formatted data to obtain replicated formatted data,
    setting the destination address field of the replicated formatted data to an address originating from a further request for the reliable unicast transmission of the data, and
    setting the acknowledgement number of the replicated formatted data such that it results in a consistent delivery acknowledgement to the one or more forwarding nodes.

15. A server configured for use in a system for transmitting data via a network, wherein the network is a programmable network comprising one or more forwarding nodes in which rules for replicating data are remotely programmable, wherein the server comprises:
    a processor configured for:
        receiving a request for reliable unicast transmission of the data;
        responding to the request by i) formatting the data in accordance with a reliable transport protocol that allows for reliable data delivery using delivery acknowledgements, to obtain the formatted data and ii) providing the formatted data to the network, the formatted data comprising a destination address field; and
    a controller configured for controlling the one or more forwarding nodes to effect a reliable multicasting of the formatted data by:
replicating the formatted data to obtain replicated formatted data,
setting the destination address field of the replicated formatted data to an address originating from a further request for the reliable unicast transmission of the data, and
setting the acknowledgement number of the replicated formatted data such that it results in a consistent delivery acknowledgement to the one or more forwarding nodes.

* * * * *